United States Patent Office 3,806,484
Patented Apr. 23, 1974

3,806,484
PREPARATION OF AQUEOUS EMULSIONS OF ACRYLIC MONOMERS
Douglas Stuart William Dargan, Durham, England, assignor to The British Oxygen Company Limited, London, England
No Drawing. Filed Mar. 17, 1972, Ser. No. 235,859
Claims priority, application Great Britain, Mar. 19, 1971, 7,300/71
Int. Cl. C08f 1/62, 45/27
U.S. Cl. 260—29.6 TA
13 Claims

ABSTRACT OF THE DISCLOSURE

A process for the preparation of an aqueous acrylic polymer emulsion from which according to the composition of the polymeric material in the emulsion a strippable coating or pressure-sensitive adhesive can be formed. The process involves the formation of an aqueous pre-emulsion of monomers including most of the water required for the final emulsion.

BACKGROUND OF THE INVENTION (a) Field of the invention

This invention relates to a process for the preparation of an aqueous acrylic polymer emulsion or dispersion. According to the composition of the acrylic polymer, a strippable coating or pressure-sensitive adhesive can be formed from such an aqueous acrylic emulsion by applying the emulsion to a surface chosen to bear the adhesive or coating, and then drying the applied emulsion.

(b) Description of prior art

Established procedures for the preparation of an aqueous acrylic polymer emulsion involve either the addition of all the necessary monomers for the polymer to water, and the addition of a polymerization initiator to the aqueous phase at such a rate that the heat evolved during the polymerization reaction is readily dissipated; or adding the monomers in portions to an aqueous phase including the polymerization initiator.

It has been found that these procedures generally cannot yield a stable emulsion having a solids content of greater than 50% by weight. Since in most instances the emulsions are transported from the manufacturer to a customer who applies the emulsion to surfaces that he wishes to coat, it is desirable to increase the solids content of the emulsions so as to reduce transport costs.

One recent proposal for increasing the solids content of a polymer emulsion includes the steps of forming a pre-emulsion of the monomers, water, and surfactant and adding the pre-emulsion gradually, with initiator, to a reaction vessel containing water. The applicants have found, however, that this procedure leads to emulsions having an undesirably high viscosity, so that they are difficult to handle and to apply to a surface to be coated.

DESCRIPTION OF THE INVENTION

The invention is based on a particular order of introducing the various constituents employed to form the emulsion that permits substantially all the water required for the final emulsion to be added to a pre-emulsion.

According to the invention there is provided a process for the preparation of an aqueous emulsion of an acrylic polymer, which comprises forming an aqueous pre-emulsion of one or more acrylic monomers, a surfactant and a redox catalyst; adding portions of oxidant and reductant to a portion of the pre-emulsion to effect polyerization; adding a further portion of oxidant to the remainder of the pre-emulsion; then adding to the polymerized portion the said remainder and a further portion of reductant to effect further polymerization; and then adding another portion of oxidant to complete the polymerization; the quantity of water employed in forming the pre-emulsion being greater than 90% by weight of the water required for the polymer emulsion.

The process is well suited to the preparation of all types of aqueous acrylic polymer emulsions, including acrylic emulsions dispersions for pressure sensitive adhesives for example and of acrylonitrile terpolymer emulsions for strippable coatings.

Typical monomers that can be employed in the emulsions are, for example: alkyl acrylates, for example, ethyl acrylate, propyl acrylate, butyl acrylate, pentyl acrylate, hexyl acrylate, heptyl acrylate, octyl acrylate, and 2-ethyl hexyl acrylate; methacrylates, for example, alkyl methacrylates such as methyl methacrylate, ethyl methacrylate, or propyl methacrylate, and lauryl methacrylate; acrylonitrile; styrene; itaconic acid; acrylic acid; and methacrylic acid.

In the context of this specification the term "acrylic polymer" indicates a polymer containing units derived from an acrylic monomer. The polymer may also contain non-acrylic units.

If a pressure-sensitive adhesive is to be derived from the emulsion, the monomers for the emulsion may include at least 66% by weight of at least one $C_2$ to $C_3$ alkyl acrylate, with a balance made up of at least one monomer selected from $C_1$ to $C_3$ alkyl methacrylates; lauryl methacrylate; styrene; itaconic acid; acrylic acid; and methacrylic acid.

Preferably the monomers for a pressure-sensitive adhesive emulsion include (a) 3 to 6% by weight of at least one of methacrylic acid and acrylic acid;
(b) 3 to 10% by weight of at least one of methyl methacrylate and acrylonitrile; and
(c) 84 to 94% by weight of at least one $C_4$ to $C_8$ alkyl acrylate.

If a strippable protective coating is to be formed from the emulsion, the monomers for the emulsion may be made up of at least 25% by weight of acrylonitrile; and a balance of at least one monomer selected from $C_4$ to $C_8$ alkyl acrylates. The emulsion may additionally include at least one monomer selected from $C_1$ to $C_3$ alkyl methacrylates and lauryl methacrylate.

Preferably the monomers for a strippable coating emulsion include (a) 50 to 60% by weight of butyl acrylate;
(b) at least 25% by weight of acrylonitrile; and
(c) at least 1% by weight of methyl methacrylate.

The quantity of water employed in forming the pre-emulsion is preferably substantially the whole of water required for the polymer emulsion.

The pre-emulsion is preferably prepared in a form of apparatus, for example a high speed mixer, that provides high shear conditions. The use of high shear conditions facilitates the formation of the emulsion.

The surfactant is preferably an alkali metal, for example sodium or potassium, or an ammonium salt of a sulphuric acid ester of a condensate of ethylene oxide and an alkyl phenol, an alkyl cresol, a fatty acid, a fatty alcohol, a fatty amide or a fatty amine. The sodium, potassium, and ammonium salts of $C_8$ to $C_{14}$ alkyl phenol (e.g. octyl or nonyl phenol) or of a $C_8$ to $C_{14}$ alkyl cresol (e.g. octyl or nonyl cresol) condensed with from 5 to 105 moles of ethylene oxide per mole of phenol or cresol are in particular preferred. The sodium salt of an octyl cresol/ethylene oxide condensate has been found particularly suitable.

The redox catalyst is preferably an aqueous solution of iron and ethylene diamine tetracetic acid (EDTA), typically formed from 0.1 part by weight of an iron compound such as ferrous sulphate heptahydrate and 1.0 part by weight of EDTA per 100 parts by weight of water.

The oxidant and reductant form the initiation system. Examples of suitable oxidants are alkyl hydroperoxides, for example butyl hydroperoxides, cumene peroxide, diisopropylbenzene peroxide and lauryl peroxide. Examples of generally suitable reductants are sodium sulphite, sodium hydrosulphite, sodium formaldehyde sulphoxylate and sodium thiosulphate.

If desired a chain transfer agent, such as tertiary dodecyl mercaptan, can be included in the pre-emulsion or added during the subsequent stages in order to control the molecular weight of the polymer.

Polymerization of the constituents of the pre-emulsion preferably includes the step of heating the pre-emulsion to a temperature in the range 40 to 70° C. before introducing the oxidant. The temperature during the further polymerization is also preferably maintained within this range, using cooling if necessary.

The polymerization is conveniently performed at atmospheric pressure.

The final emulsion is normally required to have a solids content within the range 55 to 65% by weight. Surprisingly we have found that the quantity of water required to give this proportion of solids can all be included in the pre-emulsion. Hitherto it had been supposed that only a small portion of the water could be introduced at the pre-emulsifying stage.

A particularly useful feature of the process of the invention is that it enables continuous production of polymer emulsions. Most previous proposals have needed to be carried out batchwise. The process also provides an improvement in that the pre-emulsion is of lower viscosity and therefore easier to handle than pre-emulsions previously proposed that used only a part of the water required for the final emulsion. The emulsions obtained by the process of the invention are also advantageous in having a low content of coagulated matter.

In the following examples, Examples 1, 3 and 5 to 7 illustrate the invention and Examples 2 and 4 illustrate the disadvantages of forming the pre-emulsion with only a portion of the total water required for the final emulsion.

EXAMPLE 1

The example was carried out in a flask fitted with a condenser, thermometer, dropping funnel and stirrer and provided with a means for heating or cooling.

The following ingredients were thoroughly mixed in 370 parts by weight (p.b.w.) of water by using a high speed mixer capable of producing high shear mixing:

| | P.b.w. |
|---|---|
| Butyl acrylate | 455 |
| Methyl methacrylate | 25 |
| Acrylic acid | 20 |
| Tertiary dodecyl mercaptan | 0.43 |
| Fe/EDTA solution | 1 |
| Sodium salt of the sulphuric acid ester of an octyl cresol ethylene oxide condensate containing 92 moles of ethylene oxide/mole of octyl cresol | 60 |

The pre-emulsion thus formed was a mobile, creamy liquid. 250 p.b.w. of the emulsion thus formed were added to a flask and heated to 50° C. Then was added

| | P.b.w. |
|---|---|
| Solution containing 2 p.b.w. sodium formaldehyde sulphoxylate (SFS) in 7 parts water | 2 |
| Tertiary butyl hydroperoxide (TBHP) | 0.44 |

The temperature of the flask contents rose rapidly to 80° C, forming a mobile, coagulum-free, polymer emulsion. 0.61 p.b.w. of TBHP were stirred into the remaining monomer pre-emulsion and the pre-emulsion added gradually to the flask over a period of 2 hours together with a further 5 p.b.w. of SFS solution. The temperature of the flask during this gradual addition was controlled at 55–65° C. When all the pre-emulsion had been added to the flask a further 2 portions of 0.044 p.b.w. of TBHP were added to complete the polymerization.

The resulting emulsion was found to have a total solids content of 55.1%, a low viscosity, and to contain negligible coagulum. A dried film of the product had the typical tack and adhesion of a pressure sensitive adhesive.

EXAMPLE 2 (COMPARATIVE)

The same procedure was used as in Example 1 except that the pre-emulsion contained only 160 parts by weight of water. 210 parts by weight water were added to the flask and only 100 ml. of the pre-emulsion added to the flask at 50° C. The pre-emulsion in this case was a very viscous creamy liquid.

The polymer emulsion had a total solids content of 55% and was of higher viscosity than Example 1.

EXAMPLE 3

The same procedure was used as in Example 1 except that 298 p.b.w. of water were used to form the pre-emulsion. The pre-emulsion was a mobile, creamy liquid, and the final polymer emulsion had a total solids content of 60% and was of medium viscosity.

EXAMPLE 4 (COMPARATIVE)

The same procedure was used in Example 2 except that 88 parts by weight of water were used to form the pre-emulsion. The pre-emulsion was so viscous that it could not be fed to the reactor by gravity and the experiment was abandoned.

EXAMPLE 5

The procedure of Example 1 was repeated in all essentials except that the following monomers were used in place of the monomers specified in Example 1.

| | P.b.w. |
|---|---|
| Butyl acrylate | 455 |
| Acrylonitrile | 25 |
| Acrylic acid | 20 |

The resulting emulsion had a solids content of 55%, a low viscosity and contained negligible coagulum. A dried film of the product had the typical tack and adhesion of a pressure sensitive adhesive.

EXAMPLE 6

The procedure of Example 1 was repeated in all essentials, except that the following monomers were used in place of the monomers specified in Example 1.

| | P.b.w. |
|---|---|
| Butyl acrylate | 465 |
| Methyl metacrylate | 15 |
| Acrylic acid | 20 |

The resulting emulsion was found to have a solids content of 55%, a low viscosity, and to contain negligible coagulum. A dried film of the product had the typical tack and adhesion of a pressure-sensitive adhesive.

EXAMPLE 7

The procedure of Example 1 was adopted in all essential details, except that the following monomers were used in place of the monomers specified in Example 1.

| | P.b.w. |
|---|---|
| Butyl acrylate | 288 |
| Acrylonitrile | 138 |
| Methyl methacrylate | 75 |

Strippable protective coatings were formed from the resulting emulsion, as follows. Samples of the emulsion were cast onto substrate panels of mild steel, steel sheet coated with stoved aminoalkyd paint, aluminium sheet and chromium plated stainless steel. A drawdown blade was used to give a dry film thickness of 0.05 mm. The panels were allowed to dry naturally at 15° C. and then stored indoors for a long period. Inspection of the stored panels showed that the film was clear and glossy and stripped easily from the substrates. In addition the substrates from which the film had been removed showed no signs of damage or contamination.

I claim:

1. A process for the preparation of an aqueous emulsion of an acrylic polymer including the steps of:
   (i) forming an aqueous pre-emulsion of one or more acrylic monomers, a surfactant, and a redox catalyst, and heating the pre-emulsion to from 50 to 70° C.;
   (ii) adding portions of oxidant and reductant to a portion of the pre-emulsion to effect polymerization;
   (iii) adding a further portion of oxidant to the remainder of the pre-emulsion;
   (iv) then adding to the polymerized portion the said remainder and a further portion of reductant to effect further polymerization;
   (v) and then adding another portion of oxidant to complete the polymerization;
   the quantity of water employed in forming the pre-emulsion being greater than 90% by weight of the water required for the polymer emulsion having a solids content within the range 55 to 65% by weight.

2. A process according to claim 1 in which the monomers are selected from alkyl acrylates having from two to eight carbon atoms in the alkyl radical; alkyl methacrylates having from one to three carbon atoms in the alkyl radical; lauryl methacrylate; acrylic acid; methacrylic acid; acrylonitrile; styrene; and itaconic acid.

3. A process according to claim 1 in which the monomers for the emulsion consist of
   (i) at least 66% by weight of at least one alkyl acrylate having from two to eight carbon atoms in the alkyl radical; and
   (ii) a balance of at least one monomer selected from alkyl methacrylates having from one to three carbon atoms in the alkyl radical; lauryl methacrylate; styrene; itaconic acid; acrylic acid; and methacrylic acid.

4. A process according to claim 3, in which the monomers for the emulsion consist of:
   (i) 3 to 6% by weight of at least one of methacrylic acid and acrylic acid;
   (ii) 3 to 10% by weight of at least one of methyl methacrylate and acrylonitrile; and
   (iii) 84 to 94% by weight of at least one alkyl acrylate having from four to eight carbon atoms in the alkyl radical.

5. A process according to claim 1, in which the monomers for the emulsion include
   (i) at least 25% by weight of acrylonitrile; and
   (ii) a balance of at least one monomer selected from alkyl acrylates having from 4 to 8 carbon atoms in their alkyl radicals; alkyl methacrylates having from 1 to 3 carbon atoms in their alkyl radicals; and lauryl methacrylate.

6. A process according to claim 5, in which the monomers for the emulsion consist of
   (a) 50 to 60% by weight of butyl acrylate;
   (b) at least 25% by weight of acrylonitrile; and
   (c) at least 1% by weight of methyl methacrylate.

7. A process according to claim 1, in which the surfactant is selected from at least one member of the group consisting of alkali metal and ammonium salts of a sulphuric acid ester of a condensate of ethylene oxide and at least one of an alkyl phenol, and alkyl cresol, a fatty acid, a fatty alcohol, a fatty amide and a fatty amine.

8. A process according to claim 7, in which the surfactant is selected from the sodium, potassium and ammonium salts of a condensate of 5 to 105 molar proportions of ethylene oxide to one molar proportion of at least one of an alkyl phenol having from eight to fourteen carbon atoms in the alkyl radical and an alkyl cresol having from eight to fourteen carbon atoms in the alkyl radical.

9. A process according to claim 1, in which the redox catalyst is an aqueous solution of iron and ethylene diamine tetracetic acid; the oxidant is selected from at least one member of the group consisting of alkyl hydroperoxides, cumene peroxide, diisopropyl benzene peroxide and lauryl peroxide; and the reductant is selected from at least one member of the group consisting of sodium sulphite, sodium hydrosulphite, sodium formaldehyde sulphoxylate and sodium thiosulphate.

10. A process according to claim 1, in which a chain transfer agent is included in the pre-emulsion or added during the subsequent stages in order to control the molecular weight of the polymer.

11. A process as claimed in claim 1, in which the temperature during the further polymerization is maintained within the range 40 to 70° C.

12. A process as claimed in claim 1, in which the quantity of water employed in forming the pre-emulsion is substantially the whole of the water required for the pre-emulsion.

13. A process as claimed in claim 1 wherein the aqueous pre-emulsion is prepared by high speed mixing providing high shear conditions.

References Cited
UNITED STATES PATENTS

| | | | |
|---|---|---|---|
| 3,104,231 | 9/1963 | Fitch | 260—29.6 TA |
| 3,219,610 | 11/1965 | Tillson | 260—29.6 TA |
| 3,455,861 | 7/1969 | Bresciani et al. | 260—29.6 T |
| 3,692,726 | 9/1972 | Oehmichen | 260—29.6 TA |
| 3,637,563 | 1/1972 | Christena | 260—29.6 RW |

LUCILLE M. PHYNES, Primary Examiner

U.S. Cl. X.R.

260—29.6 RB, 29.6 RW, 29.6 T, 95 R